US009003042B2

(12) United States Patent
Choi

(10) Patent No.: US 9,003,042 B2
(45) Date of Patent: Apr. 7, 2015

(54) P2P FILE TRANSMISSION SYSTEM AND METHOD

(75) Inventor: Sung-Wone Choi, Seoul (KR)

(73) Assignee: NHN Corporation, Seongnam-si (KR)

( * ) Notice: Subject to any disclaimer, the term of this patent is extended or adjusted under 35 U.S.C. 154(b) by 940 days.

(21) Appl. No.: 12/193,552

(22) Filed: Aug. 18, 2008

(65) Prior Publication Data

US 2008/0301233 A1 Dec. 4, 2008

Related U.S. Application Data

(63) Continuation of application No. PCT/KR2007/000686, filed on Feb. 8, 2007.

(30) Foreign Application Priority Data

Feb. 17, 2006 (KR) .................. 10-2006-0015602

(51) Int. Cl.
*G06F 15/16* (2006.01)
*H04L 29/08* (2006.01)
(Continued)

(52) U.S. Cl.
CPC .......... *H04L 67/104* (2013.01); *H04L 61/2589* (2013.01); *H04L 67/143* (2013.01); *H04W 88/04* (2013.01); *H04L 67/141* (2013.01); *H04W 76/02* (2013.01); *H04L 29/12566* (2013.01); *H04L 67/14* (2013.01); *H04L 67/06* (2013.01); *H04L 67/1091* (2013.01); *H04L 67/28* (2013.01); *H04L 69/40* (2013.01)

(58) Field of Classification Search
CPC ... H04L 67/104; H04L 67/06; H04L 67/1091; H04L 67/28; H04L 69/40; H04L 67/14; H04L 67/141; H04L 67/143; H04L 29/12566; H04L 61/2589; H04W 76/02; H04W 88/04
USPC ......... 709/201–203, 206, 219, 225, 249, 217, 709/227
See application file for complete search history.

(56) References Cited

U.S. PATENT DOCUMENTS 7,080,225 B1 * 7/2006 Todd .......................... 711/165
7,370,004 B1 * 5/2008 Patel et al. ................. 705/14.37
(Continued)

FOREIGN PATENT DOCUMENTS

WO 2004/086247 10/2004
WO 2005/078593 8/2005

OTHER PUBLICATIONS

Japanese Office Action issued Oct. 12, 2010 in corresponding Japanese Application No. 2008-555141.

*Primary Examiner* — Oleg Survillo
(74) *Attorney, Agent, or Firm* — Greer Burns & Crain, Ltd.

(57) ABSTRACT

The present disclosure is related to a P2P file transmission system and method, the system according to the present disclosure may include a P2P node managing system managing users connected to the system, and managing P2P file transmissions between the users; and a relay server relaying the file transmitted to the file receiver from the file sender when the P2P file transmission by the direct connection between the file sender and the file receiver fails. According to an embodiment of the present disclosure, the present disclosure provides more stable file transmissions under an unstable environment for the P2P file transmission such as NAT and the P2P file transmission system may be applied to various network places.

12 Claims, 9 Drawing Sheets

(51) Int. Cl.
  *H04L 29/12* (2006.01)
  *H04W 88/04* (2009.01)
  *H04W 76/02* (2009.01)
  *H04L 29/14* (2006.01)

(56) References Cited

U.S. PATENT DOCUMENTS

| | | | |
|---|---|---|---|
| 8,412,846 B2* | 4/2013 | Shao et al. | 709/245 |
| 2003/0101116 A1* | 5/2003 | Rosko et al. | 705/35 |
| 2004/0034705 A1* | 2/2004 | Focsaneanu | 709/225 |
| 2005/0021770 A1* | 1/2005 | Helm et al. | 709/228 |
| 2006/0155814 A1* | 7/2006 | Bennett et al. | 709/207 |
| 2006/0178216 A1* | 8/2006 | Shea et al. | 463/42 |
| 2006/0182100 A1* | 8/2006 | Li et al. | 370/389 |
| 2006/0194596 A1* | 8/2006 | Deng | 455/466 |
| 2006/0203831 A1* | 9/2006 | Yoshizawa et al. | 370/401 |
| 2006/0234746 A1* | 10/2006 | Bouat | 455/518 |
| 2006/0294213 A1* | 12/2006 | Saridakis | 709/223 |
| 2007/0192508 A1* | 8/2007 | Sollee | 709/245 |
| 2007/0204272 A1* | 8/2007 | Chen et al. | 719/310 |
| 2007/0220156 A1* | 9/2007 | Dickerman et al. | 709/227 |
| 2009/0055473 A1* | 2/2009 | Synnergren | 709/204 |
| 2009/0075642 A1* | 3/2009 | Rantapuska et al. | 455/422.1 |
| 2013/0039364 A1* | 2/2013 | Pankratov | 370/389 |
| 2013/0067101 A1* | 3/2013 | Xu et al. | 709/228 |
| 2014/0052870 A1* | 2/2014 | Abuan et al. | 709/227 |

* cited by examiner

FIG. 4

| channel ID | user ID | public IP | public port | private IP | private port |
|---|---|---|---|---|---|
| 400 | 402 | 404 | 406 | 408 | 410 |

FIG. 5

| channel ID | maximum user number | number of participating users | information of the participating users |
|---|---|---|---|
| 500 | 502 | 504 | 506 |

P2P FILE TRANSMISSION SYSTEM AND METHOD

BACKGROUND

1. Field

The present disclosure relates to a system and method of file transmissions, more specifically, a Peer to Peer (P2P) file transmission system and method which sends and receives files by a direct connection between peers.

2. Discussion of the Related Art

P2P is a technology for searching and exchanging files between computers. P2P sharing can be between individual clients and a server, or by sharing IP addresses between clients. Napster is an example of commercial P2P service.

P2P can be used to exchange files, such as music files. But, P2P can also be applied to various fields, such as file transmissions between users in messenger systems, voice data transmissions in internet phones, etc.

Unfortunately, P2P can suffer from improper file transmissions under specific network environments. As an example, when a client uses Network Address Translation (NAT), a normal P2P transmission of files often fails. Especially, when both the sender and the receiver use NAT, P2P transmission problems can become worse.

NAT is used frequently. The use of NAT allows multiple users using private IP addresses to share one public IP address by inter-conversion of the private IP addresses to the public IP address so that limited public IP address resources can be saved. In addition, NAT helps protect users' terminals from external attacks and provides many merits in security.

Unstable P2P file transmissions highlight the use of NAT and various security protection systems. In order to overcome the instability of P2P file transmission in NAT, a UDP hole punching method has been suggested, but this solution is limited to UDP. And, the instability problem with NAT cannot be solved entirely by known solutions, such as hole punching.

SUMMARY

The present disclosure provides a P2P file transmission system and method capable of much more stable file transmissions. The present disclosure further provides a P2P file transmission system and method which monitors file transmitting conditions, and if the file transmitting condition is unstable, relays file transmissions through an extra server.

The present disclosure further provides a P2P file transmission system and method which can be applied to various network places. The additional aspects and advantages of the present disclosure can be understood easily by the description below.

According to an embodiment of the present disclosure, a P2P file transmission system can include: a P2P node managing system managing information of user clients connected through the network and providing the information of the connected user clients according to a specific user client's request, wherein the information of user clients includes user ID information and address information, and a relay server relaying file transmissions between a first user client and a second user client when the P2P file transmission by a direct connection between the first user client and the second user client connected to the P2P node managing system fails According to another embodiment of the present disclosure, a P2P application is installed in the user clients, and the P2P application transmits the user ID information and the address information to the P2P node managing system when connecting, and tries P2P file transmission by direct connection between the first user client and the second user client.

According to another embodiment of the present disclosure, if the first user client requests the transmission with the second user client, the relay server receives the file transmission request information from the first user client and relays information needed for the file transmission between the first user client and the second user client by generating channel.

According to another embodiment of the present disclosure, the P2P node managing system includes one chosen from a P2P file sharing system, a messenger file transmission system, an internet telephone system, and a game system.

According to another embodiment of the present disclosure, the information needed for the file transmission is one chosen from user ID information, public IP address information, public port numbers, private IP address information, private port numbers, and combinations thereof.

According to another embodiment of the present disclosure, the relay server relays the file transmission between the first user client and the second user client through the channel.

According to another embodiment of the present disclosure, the relay server requests the transmission of a channel invitation message as receiving the request of the file transmission from the first user client with the second user client, and the P2P node managing system responses to the request from the relay server and transmits the channel invitation message to the second user client.

According to another embodiment of the present disclosure, the first user client provides the address information of the second user client, when requesting the file transmission with the second user client, to the relay server, and the relay server transmits the channel invitation message to the second user client using the address information of the second user client.

According to an embodiment of the present disclosure, a relay server can include a channel generating module which manages information of user clients connected through the network, interworks with a P2P node managing system providing the information of the connected user clients according to the request of a specific user client, wherein the user client information comprises user ID information and address information, and generates channels according to a channel generating request of a first user client receiving the information of the connected user clients from the P2P node managing system; and a file relaying module which relays the file transmission between the first user client and a second user client through the channel in case the P2P file transmission by a direct connection between the first user client and the second user client participating in the channel fails.

According to another embodiment of the present disclosure, a relay server can include: a channel information managing module managing information of the at lease one channel among the channels generated by the channel generating module; a channel participation processing module performing a predetermined process for inviting one or more second user clients whom the first user client requesting the channel generation specified using the information of the connected user clients from the P2P node managing system and processing the channel participation of the second user client.

According to another embodiment of the present disclosure, the channel information managing module manages channel ID information provided when the channels are generated, number information of the user participating in the channels and information of the user participating in the channels.

According to another embodiment of the present disclosure, the relay server relays the information needed for the file transmission between the first user client and the second user client through the channel, and the information needed for the file transmission includes one chosen from public IP addresses, public port numbers, private IP addresses, private port numbers, and combinations thereof.

According to another embodiment of the present disclosure, the predetermined process is a request to the P2P node managing system for the transmission of the channel invitation message to the second user client.

According to another embodiment of the present disclosure, the first user client provides the address information of the second user client, and the predetermined process is the transmission of the invitation message to the second user client using the address information of the second user client.

According to another embodiment of the present disclosure, the generated channel is shut down when the predetermined time is elapsed after the first user client and the second user client participating in the channel go out of the channel According to an embodiment of the present disclosure, a file transmission method can include: generating channels in responding to a request of a user; relaying information needed for the P2P file transmission of the users participating in the channels through the generated channel; determining whether the P2P file transmission by the direct connection between the users participating in the channels is successful; and relaying the file transmission between the users through the generated channels in case the P2P file transmission by the direct connection between the users participating in the channels fails.

According to another embodiment of the present disclosure, the information needed for the file transmission is one chosen from public IP address information, public port numbers, private IP address information, private port numbers, and combinations thereof.

According to another embodiment of the present disclosure, a file transmission method can include: generating a channel invitation message for the user generating the channels inviting another user to the channels, and the channel invitation message is transmitted to the P2P node managing system, and the P2P node managing system transmits the invitation message to the corresponding user.

According to another embodiment of the present disclosure, a file transmission method can include: generating a channel invitation message for the user generating the channels to invite another user to the channel, and the address information of the another user is provided by the user generating the channel, and the channel invitation message is transmitted to the corresponding user according to the address information.

BRIEF DESCRIPTION OF THE DRAWINGS

FIG. 4 shows a block diagram of the user information data according to an embodiment of the present disclosure.

FIG. 5 shows a block diagram of the channel managing data, which the channel managing module manages, according to an embodiment of the present disclosure manages.

DETAILED DESCRIPTION OF EMBODIMENTS

Features of the embodiments will become more apparent through the below description with reference to the accompanying drawings. Since there can be a variety of permutations and embodiments of the present disclosure, certain embodiments will be illustrated and described with reference to the accompanying drawings. This, however, is by no means to restrict the present disclosure to certain embodiments, and shall be construed as including all permutations, equivalents and substitutes covered by the spirit and scope of the present disclosure.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present disclosure. The term "and/or" shall include the combination of a plurality of listed items or any of the plurality of listed items.

When one element is described as being connected or accessed to another element, it shall be construed as being connected or accessed to the other element directly but also as possibly having another element in between. On the other hand, if one element is described as being directly connected or directly accessed to another element, it can be construed that there is no other element in between.

The terms used in the description are intended to describe certain embodiments and shall by no means restrict the present disclosure. Unless clearly stated otherwise, expressions in the singular include the plural meaning. In the present description, an expression such as including, comprising or having is intended to designate a characteristic, a number, a step, an operation, an element, a part or combinations thereof and shall not be construed to preclude any presence or possibility of one or more other characteristics, numbers, steps, operations, elements, parts or combinations thereof.

Unless otherwise defined specifically, all terms, including technical terms and scientific terms, used herein have the same meaning as how they are generally understood by those of ordinary skill in the art to which the disclosure pertains. Any term that is defined in a general dictionary shall be construed to have the same meaning in the context of the relevant art, and, unless otherwise defined explicitly, shall not be interpreted to have an idealistic or excessively formalistic meaning.

Embodiments of the P2P file transmission system and method according to the present disclosure will now be described in detail with reference to the accompanying drawings.

Figure 1:
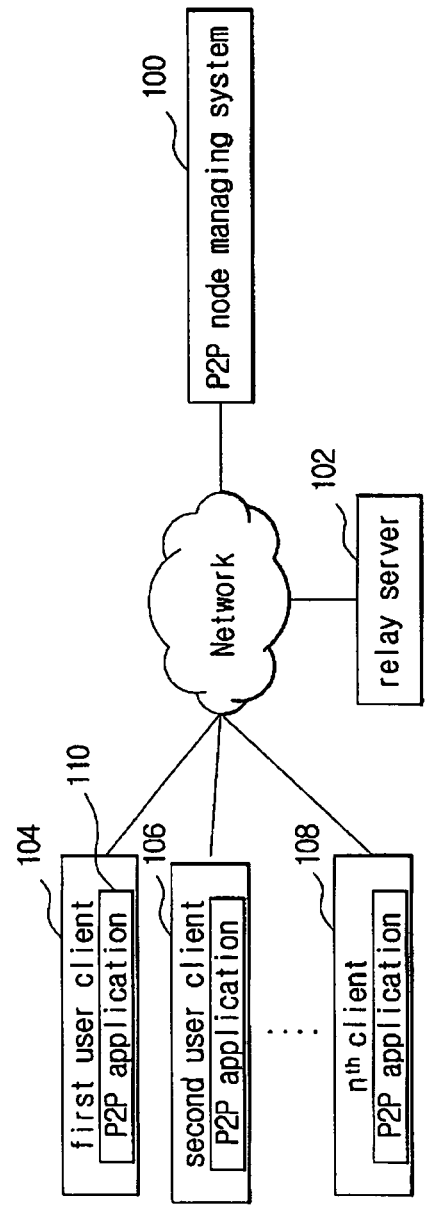
FIG. 1 shows a block diagram of a P2P file transmission system in accordance with an embodiment of the present disclosure.

FIG. 1 shows a block diagram of a P2P file transmission system in accordance with an embodiment of the present disclosure. Referring to FIG. 1, the P2P file transmission system can include a P2P node managing system 100 and a relay server 102. In the P2P file transmission system, some user clients 104, 106, 108 perform communications through a network.

The P2P node managing system 100 is a system, which provides P2P file transmission services and manages the user client nodes connected for the P2P transmission, and can include various types of P2P service systems. For example, the P2P node managing system 100 can be a messenger system, which provides P2P file transmissions with users in the same conversation channel while communicating with other users. The P2P node managing system 100 can be a typical P2P file sharing system, which can offer to each user to read file information stored in predetermined sharing folders and provides an exchange service of selected files among the files in the sharing folder. The P2P node managing system 100 can be an internet telephone service system, which exchanges voice data between users. The P2P node managing system 100 can be an online game service system, which exchanges game data between multiple users. The P2P node managing system 100 may include various kinds of service systems besides the above-mentioned systems.

The P2P node managing system 100 manages information of users connected to the system, in case a specific user requesting the information of the connected users, and may provide the information of the connected users. The information of the connected users can include user ID information and address information. A P2P application 110 installed in user clients 104, 106, 108 transmits users' ID information and address information to the P2P node managing system 100 as the user clients are turning on or the P2P application 110 is executed, and the P2P node managing system 100 manages the received information.

In case the messenger system provides the P2P file transmission service, the P2P application 110 installed in the user clients 104, 106, and 108 can be a messenger application. In some embodiments, the P2P application 110 installed in the user clients 104, 106, 108 can be a P2P file sharing application.

The user client can include any type of terminal which can communicate through the network and process digital data. For instance, the user client can be a general personal computer (PC), a notebook computer, a cellular phone, personal digital assistant (PDA), etc. Herein the network can include a wired network such as general internet network, private network, and a wireless network such as wireless internet.

A relay server 102 can be included additionally for smooth file transmissions in unstable P2P systems, for example, such as a system using NAT. The relay server 102 can generate channels between the file sender and the file receiver and relays the file transmission between the file sender and the file receiver through the generated channels. In case the file transmission between the file sender and the file receiver becomes blocked or unstable, the relay server 102 provides the file transmitted from the file sender to the file receiver through the channels.

Therefore, according to an embodiment of the present disclosure, the P2P application 110 determines whether the direct file transmission between the file sender and the file receiver is performed properly or not. If it is determined that the file transmission is not performing properly, file relaying by the relay server 102 may be performed automatically.

According to an embodiment of the present disclosure, the P2P application 110 installed in the user clients may try a direct file transmission by the P2P transmission. For example, if a P2P file transmission fails due to NAT, the P2P application 110 can request file relaying through the relay server 102 and the file relaying process by the relay server 102 may then be performed.

According to an embodiment of the present disclosure, an address information exchange for the file transmission between the users is performed through the relay server 102. The address information for the P2P file transmission can be provided by the P2P node managing system, and the file transmission is performed through the communication between the P2P applications 110 according to the information provided by the P2P node managing system. According to an embodiment of the present disclosure, the address information and other additional information for the file transmission can be exchanged through the generated channel by the relay server 102. As the address information for the file transmission is exchanged, the P2P application 110 installed in the clients of the file sender and the file receiver may try file transmission by a direct connection. If the file transmission by a direct connection fails, the file relaying process by relay server 102 can be performed. Herein, the failure of the file transmission by the direct connection can include failure of the specification of a connection between the clients, and/or failure of file transmission even though the specification of connection is successful, and/or when the file is transmitted at a lower than a predetermined rate.

The above-described P2P file transmission system may be applied to various P2P transmissions. For illustrative purposes, a P2P file transmission system of the present disclosure is described for a P2P file transmission in a messenger.

Figure 2:
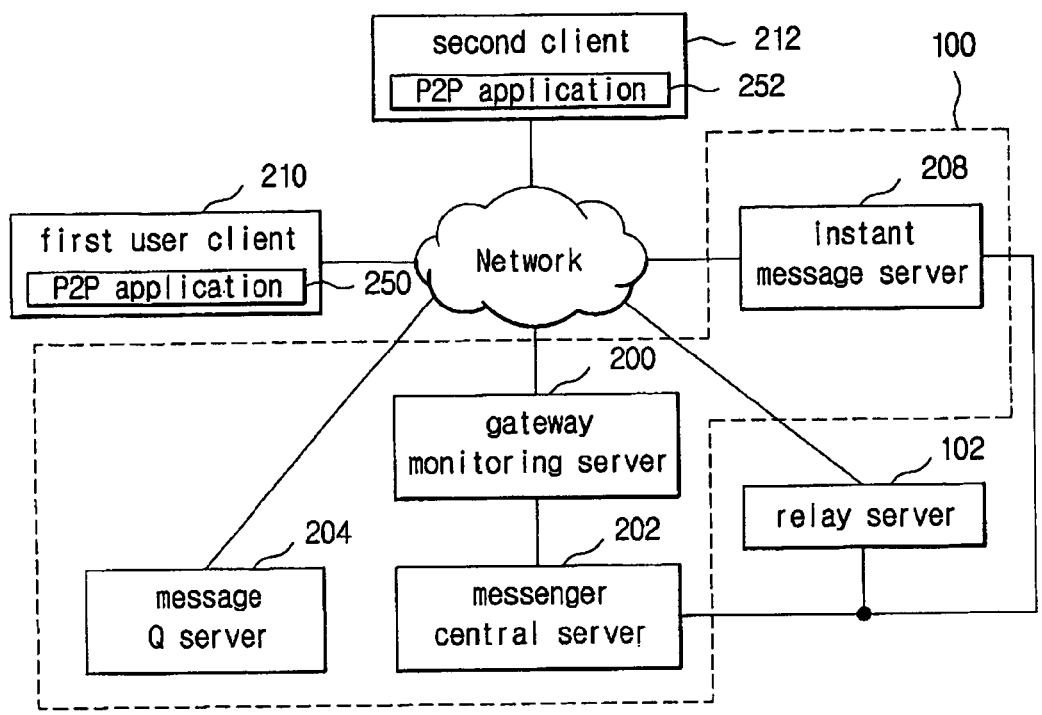
FIG. 2 shows a block diagram of a P2P file transmission system applied with a messenger system according an embodiment of the present disclosure.

FIG. 2 shows a block diagram of the P2P file transmission system for a messenger system. Referring to FIG. 2, the P2P file transmission system for the messenger system can include a gateway monitoring server 200, a messenger central server 202, a message Q server 204, a relay server 102 and an instant message server 208. P2P applications 250, 252 are installed in user clients 210, 212. As described above, the P2P applications of the messenger system may be a messenger application.

The gateway monitoring server 200 processes a connection request as the user clients 210, 212 initially connect to the messenger transmission system and, provides address information of the central server to which the user clients 210, 212 are to connect. As the user initially logs in, a log-in request of the user is transmitted to the gateway monitoring server 200 and the gateway monitoring server 200 processes the log-in request of the user and forwards the process information to the central server 202.

The messenger central server 202 is the server which controls overall instant message transmissions, manages connections of the user clients 210, 212, and processes messages transmitted by the clients and other request information. When general messages are transmitted to the messenger central server 202, the messenger central server 202 transmits the transmitted messages to the instant message server 208.

In case the user transmits an instant message, the instant message is transmitted to the message Q server 204. The message Q server 204 stores message packets in the Q and extracts a message, for example, using a First Input First Output (FIFO) queue when the instant message is transmitted. The message Q server 204 performs business logic about the extracted message and forwards the message to the messenger central server 202. The business logic, which the message Q server 204 performs, may include filtering of forbidden messages (i.e., abusive language, etc.) or a decision on a server to forwarding a packet, etc.

The instant message server 208 manages an instant messaging session between the user clients 210, 212 and relays the message packet transmitted between the user clients 210, 212. The instant message server 208 receives the message packet from the messenger central server 202 and transmits this to the receiver client.

In the messenger service, a user performs a file transmission through the communication window using communication with another user. The relay server 102 generates a channel for exchanging information each other needed for the file transmission of the users in case the user requests the file transmission through the communication window. The user information for the file transmission may include the user ID information of the opponent user and address information (such as, IP address, port number).

In FIG. 2, when the first user client 210 is a file sender and the second user client 212 is the file receiver, the P2P application 250 of the first user client 210 can request a channel be generated to the relay server. Then the relay server 102 generates the channel in response to the request, and provides the invitation message to the second user client 212 and let the second user client 212 participate in the channel. Here, since the address information of the second user client 212 is managed by the messenger central server 202, if the relay server 102 requests an invite to the file receiver to the messenger central server 202, the messenger central server 202 can transmit the invitation message to the second user client 212.

As described earlier, the P2P applications 250, 252 of the first user client, the file sender, and the second user client, the file receiver, may try the P2P file transmission through a direct connection, and determine if the P2P file transmission is possible or not. And if the P2P file transmission is not possible, the relay server 102 may relay the file transmission between the first user client 210 and the second user client 212 through the channel generated.

Figure 3:
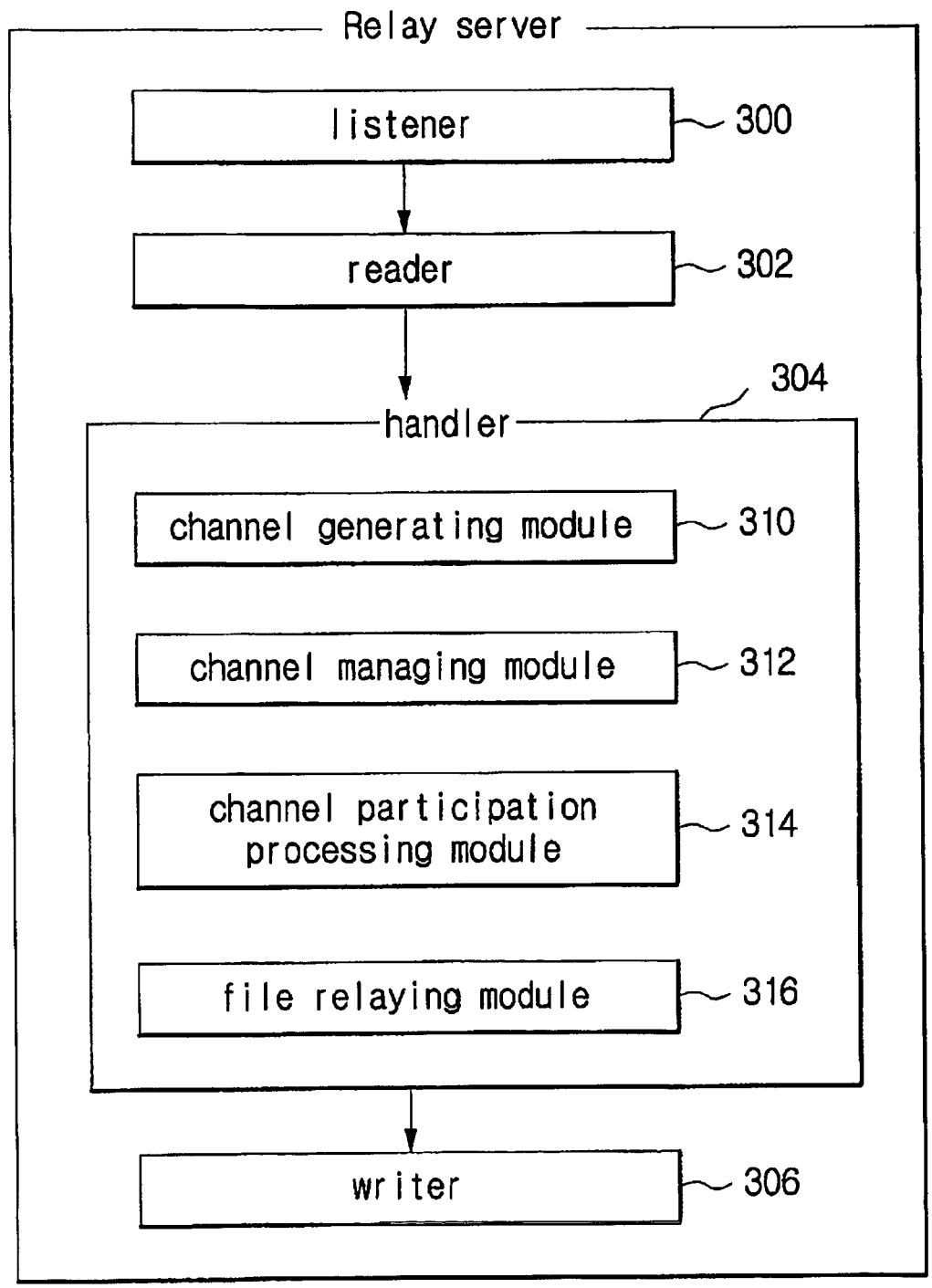
FIG. 3 shows a block diagram of a module of a relay server according to an embodiment of the present disclosure.

FIG. 3 shows a block diagram of a module of the relay server 102 according to an embodiment of the present disclosure. Referring to FIG. 3, the relay server 102 may include a listener 300, a reader 302, a handler 304 and a writer 306. The handler may include a channel generating module 310, a channel managing module 312, a channel participation processing module 314, and a file relaying module 316.

The listener 300 monitors whether the packet is delivered to the relay server 102, and if the packet is delivered, delivers this to the reader 302. The packet delivered to the listener 300 may include a channel generation requesting packet, a channel participation requesting packet, a file data packet and other various controlling message packets, etc. The listener and the user clients may perform the socket communication, and may perform the communication by the well known TCP/IP protocol.

The reader 302 reads the packet received by the listener 300 and provides the result to the handler 304. The handler 304 may perform predetermined business logic according to the kind of the packet as the packet is delivered from the reader 302.

The channel generating module 310 generates channels in case the packet transmitted from the reader 302 is the packet for requesting for the channel generation. Herein, the channel can be a logical space for exchanging the data transmitted by the users. The P2P node managing system 100 may unilaterally provide the address information of the users to exchange files. The relay server 102 can generate the channel for the initial information to be exchanged.

As a channel is generated, the channel generating module 310 provides unique channel ID information to a channel. The packet requesting the channel generation includes information about the user requesting the channel generation, and information about the user requesting the channel generation automatically participates in the channel as the channel is generated. The channel managing module 312 manages information about multiple channels generated in the relay server.

FIG. 4 shows a block diagram of the user information data according to an embodiment of the present disclosure. Referring to FIG. 4, the user information data according to an embodiment of the present disclosure includes information of a channel ID 400, a user ID 402, a public IP 404, a public port 406, a private IP 408 and a private port 410.

The user information data includes information of the private IP 408 and the private port 410 when the user uses the private IP and the private port. In some instances, the user information data does not include them when the user uses only public IP and public port. Generally, the user data information includes information about the private IP and the private port when the NAT is used.

The channel invitation message may include the user information described in FIG. 4. A user invited via the channel invitation message confirms information of the inviting user. The channel participation requesting message of the invited user can also include the user information described in FIG. 4, so that the inviting user can confirm the information of the invited user.

The file relaying module 316 relays the file transmission between the users participating in the channel. The file transmission can be performed after the file transmission requesting process and the file transmission accepting process between the users and such file transmission request. The file transmission acceptance can be also relayed by the file relaying module 316. As described earlier, the file transmission may be performed by a direct connection between the user clients after the file transmission acceptance according to the file transmission request, and the file relaying module 316 relays the file transmission between the users participating in the channel when the file transmission by the direct connection fails.

The writer 306 outputs data processed by the handler 304. For example, as the user invited requests the channel participation, the handler 304 accepts the channel participation of the corresponding user and outputs the channel participation information of the corresponding user to the writer 306, and the writer 306 transmits the channel participation information of the invited user to the inviting user.

FIG. 5 shows a block diagram of the channel managing data, which the channel managing module manages, according to an embodiment of the present disclosure. Referring to FIG. 5, the channel managing data can include a channel ID 500, maximum user number 502, number of participating users 504, and information of the participating users 506.

The channel ID 500 is an ID provided to a channel by the channel generating module 310 as channels are generated. The packet transmitted by the participating users can include information about the channel ID 500.

The maximum user number 502 is a maximum value of the possible user number to participate in the channel. The maximum user number 502 may be changed according to who generated the channel.

The number of participating users 504 is the number of users currently participating in the channel, and can be changed according to the channel participation in/out of the users. The information of participating user 506 is information of the users participating in the channel. The user information can include address information of each user and user ID information.

The channel participation processing module 314 invites an opponent user for the file transmission and processes the channel participation of the opponent user. When the user who generated the channel specifies a user to invite to the channel, the channel participation processing module 314 performs the predetermined process for the channel invitation of the corresponding user. For example, in the messenger system, the channel participation processing module 314 may request the messenger central server 202 to transmit the channel invitation message to the corresponding user.

The channel participation processing module 314 accepts the channel participation when the user who received the channel invitation message from the messenger central server 202 responds to the invitation and requests the channel participation. The channel participation requesting message of the user that received the invitation includes information of the corresponding user.

Figure 6:
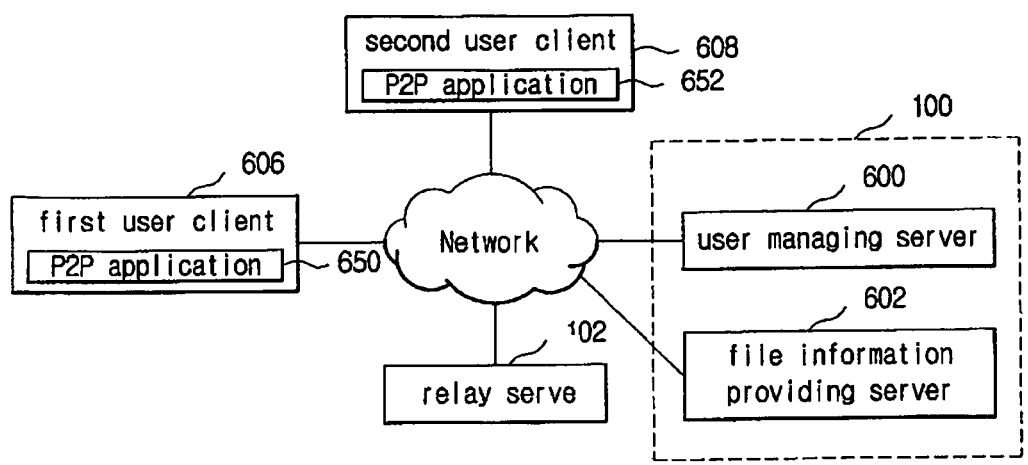
FIG. 6 shows a P2P file transmission system in which a general P2P file sharing system is applied according to an embodiment of the present disclosure.

FIG. 6 shows a P2P file transmission system in which a general P2P file sharing system is applied according to an embodiment of the present disclosure. Referring to FIG. 6, if the general P2P file sharing system is applied into the P2P file transmission system, the P2P file transmission system may include a user managing server 600, a file information providing server 602 and a relay server 102. As in the embodiment described in FIG. 2, the P2P application 650, 652 may be installed in the user clients 606, 608. In FIG. 6, the user managing server 600 and the file information providing server 602 correspond to the P2P node managing system 100 in FIG. 1.

The user managing server 600 manages address information of the users connected to the P2P file sharing system and the file information shared by each user. The P2P application 650, 652 installed in the user clients 606, 608 automatically transmits the address information of the clients and the file information shared by the corresponding client, when the clients turn on the power or the P2P application is executed by the user. And, the P2P application 650, 652 can transmit an ending signal to the user managing server 600 and informs that file sharing is unstable or blocked, such as, when the clients 606, 608 turn off the power or the P2P application 650, 652 is closed. The user managing server 600 deletes the address information of the corresponding user and the information of the shared file when receiving the ending signal.

The file providing information server 602 provides information of other users having the files requested by a user who wants to receive files and controls the P2P file exchange between the file sender and the file receiver. For example, as the user requests a movie file of the movie 'Moulin Rouge', the file information providing server 602 provides information of user clients (such as, user ID information and brief address information can be included) who have the movie file of the movie 'Moulin Rouge' as sharing files via the communication with the user managing server 600.

The P2P application 650, 652 installed in the user clients 606, 608, who received the information of the user clients having the movie file of the movie 'Moulin Rouge', exchanges the information needed for the file transmission with the specified client selected by the user through the relay server 102. As described earlier, user ID information and detailed address information (such as, IP address, port number, private IP address, private port address, etc.) of the opponent user are exchanged by the channel generated in the relay server.

As like the messenger system, whether direct file transmission is possible or not is determined by the communication between the P2P applications of the file sender and the file receiver. When the direct file transmission is unstable or blocked, the relay server 102 relays the file transmission between the file receiver and the file sender.

When the present disclosure is applied to the general P2P file sharing system shown in FIG. 6, the relay server in FIG. 3, the user information in FIG. 4 and the channel information in FIG. 5 may be identical. However, in a messenger system, the file sender may generally first generate the channel in the relay server 102, but in case the system in FIG. 6 is used, the file receiver first requests the file transmission, so that the channel may be generated in the relay server 102 by the file receiver.

According to another embodiment of the present disclosure, in the P2P file sharing system shown in FIG. 6, it may make no difference even if the information needed to the file transmission is not exchanged through the channel of the relay server 102. In the P2P file sharing system, as the user requests download of a specific file, address information for the P2P connection with the user having the corresponding file may be provided. Therefore, the user ID information and detailed address information (such as, IP address, port number, private IP address, private port address, etc.) of the opponent user needed for the file transmission may be provided by the file providing server 602. The users who would transmit the file performs the P2P connection and tries the file transmission may use the opponent user's user ID information and detailed address information.

According to another embodiment, because the information needed for the file transmission is provided from the file information providing server 602, the relay server 102 can perform the relaying process of the file transmission when the P2P file transmission with a direct connection has failed. The P2P applications 650, 652 installed in the user clients 606, 608 request to the relay server 102 for relaying the file transmission, and the relay server 102 generates a channel and relays the file transmission when the P2P file transmission by a direct connection has failed.

Figure 7:
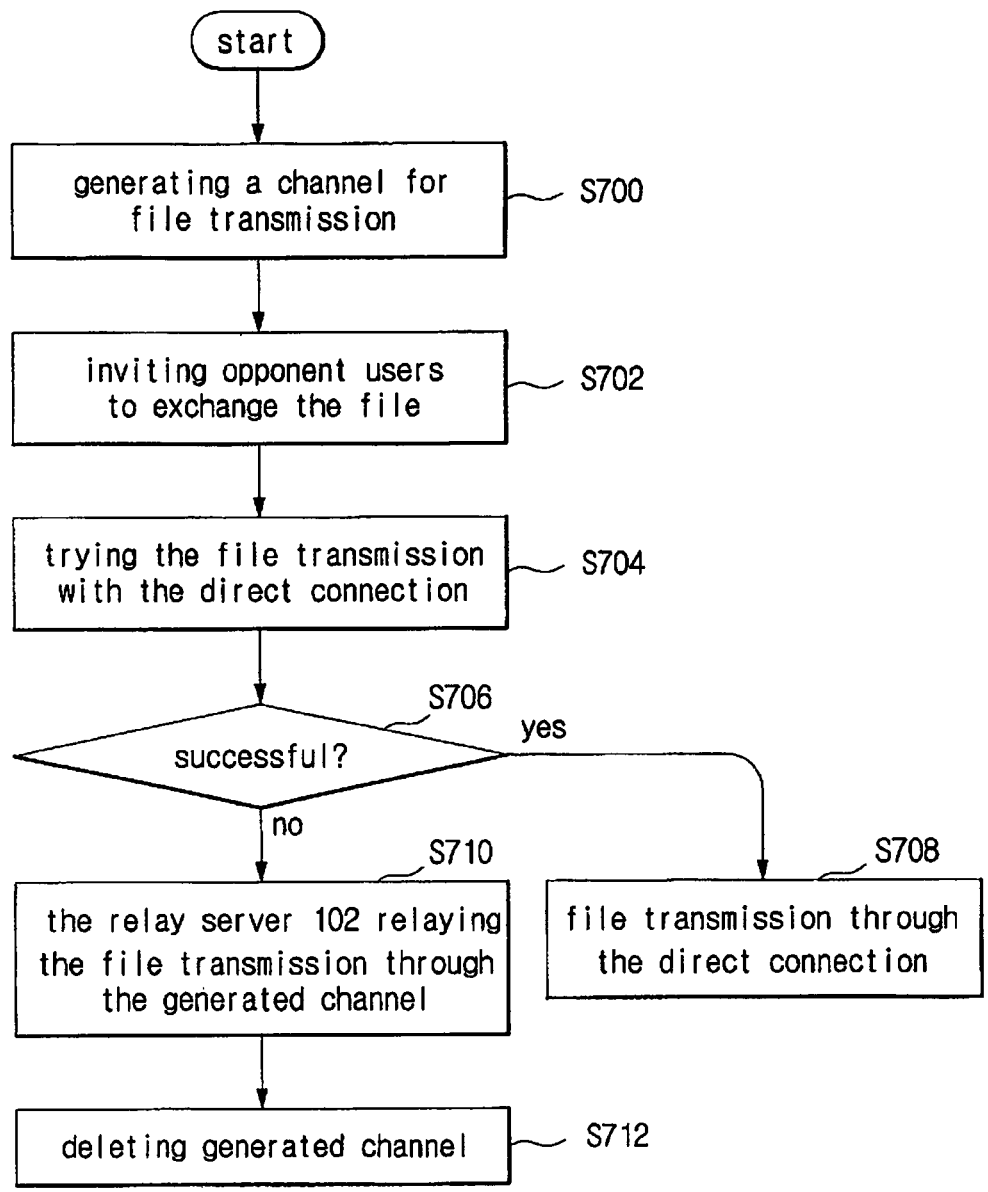
FIG. 7 shows a flowchart of a P2P file transmission method according to an embodiment of the present disclosure.

FIG. 7 shows a flowchart of a P2P file transmission method according to an embodiment of the present disclosure. Referring to FIG. 7, a channel generating module 310 of the relay server generates a channel for file transmission as a user requests transmission of a specific file in step 700.

The channel generating module 310 may generate the channel according to a request of either of a file sender and a file receiver. For example, in the messenger system shown in FIG. 2, the user, who transmits a file, first starts an action of the file transmission, so that the channel may be generated by a request of the file sender.

In some embodiments, the file receiver can start file transmission while requesting the transmission of the specific file, so that the channel may be generated by a request of the file receiver. The number of the channels which may be generated in the relay server can be decided according to the number of acceptable connections of the relay server. For example, the number of connections of the relay server may be ½ of the number of acceptable connections of the relay server.

As a channel is generated in the relay server 102, the channel participation processing module 314 invites opponent users to exchange the file at step 702. Information of the opponent user is provided by the user who generated the channel. The relay server transmits the invitation message via another server having the address information of the opponent user, or directly transmits the invitation message to the corresponding user with the address information of the opponent user provided from another server.

The server having the address information of the opponent user may be the messenger central server 202. The server having the address information may be the user managing server 600. Of course, the address information of the opponent user may be provided by the user who generated the channel or managed by the relay server itself. The channel participation processing module 314 may transmit the invitation message to a corresponding user directly. As the opponent user participates in the channel in response to the invitation message, the P2P applications 650, 652 installed in the clients 606, 608 of the file sender and the file receiver, respectively, may try the file transmission with the direct connection at step 704.

According to an embodiment of the present disclosure, the file transmission with a direct connection may include two steps. The first step may be a file transmission by the P2P application through a TCP connection between the file sender and the file receiver, as a general P2P connection. In case the first step fails, the second step may be a file transmission by the P2P application through UDP hole punching.

The UDP hole punching may be a method that the P2P application tries to pass through middle boxes and allows direct connections. The file can be transmitted continuously through a direct connection when the TCP connection or the connection by UDP hole punching is configured successfully and the file transmission is performed successfully at step 708.

If the file transmission through the TCP connection or UDP hole punching is unsuccessful, the file relaying module 316 of the relay server 102 relays the file transmission through the generated channel at step 710. The file sender transmits the file to the relay server, and the relay server transmits the received file to another user participating in the channel in which the file sender participates. The file sender and the file receiver configure the TCP connection with the relay server when participating in the channel of the relay server, and may communicate with the relay server by a TCP/IP connection. As the file relaying is completed, the generated channel may be deleted at step 712.

Figure 8:
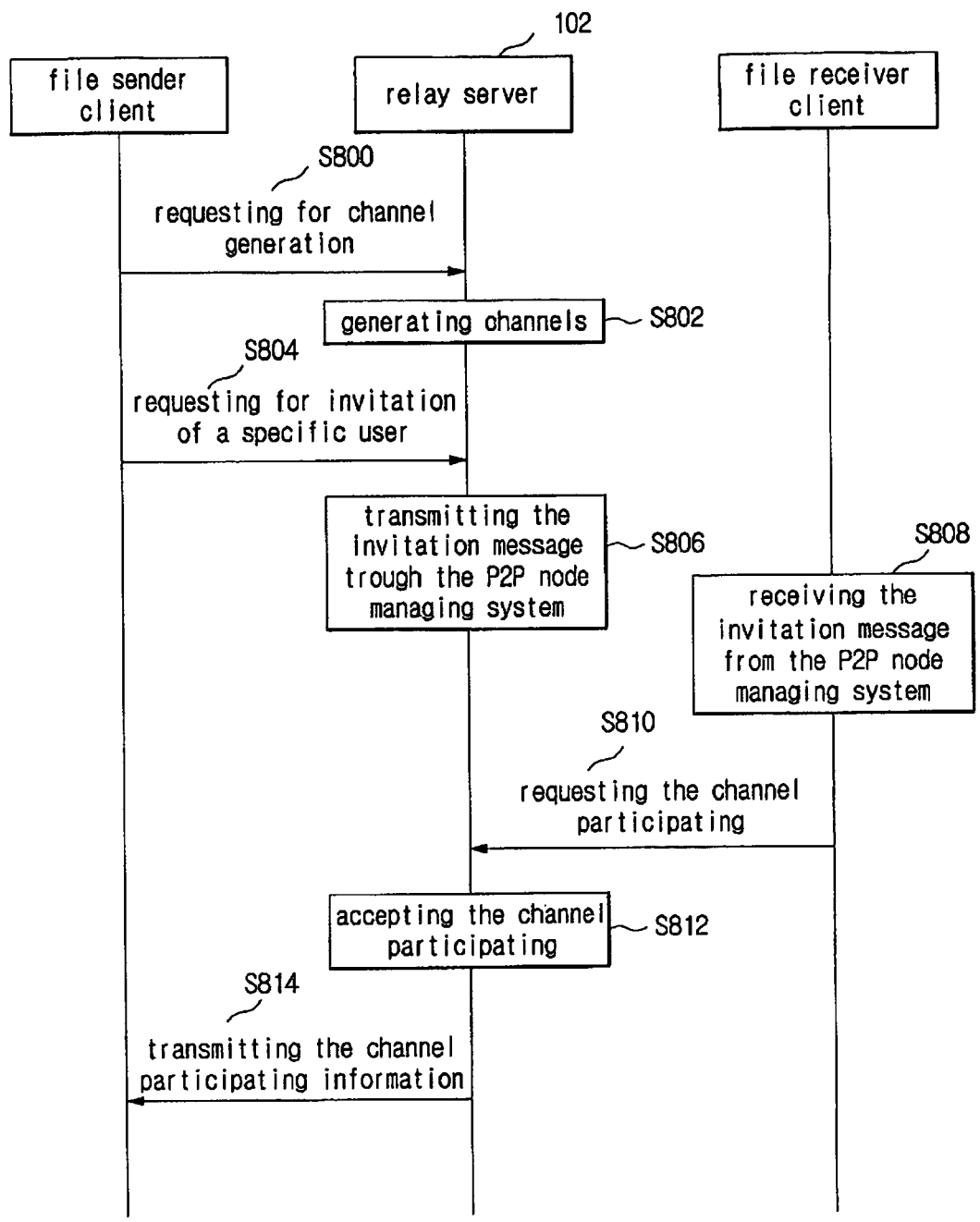
FIG. 8 shows a flowchart of the process in which channels are generated in a relay server and users participate to transmit files according to an embodiment of the present disclosure.

FIG. 8 shows a flowchart of the process in which the channel is generated in the relay server 102 and the users participate to transmit files. Referring to FIG. 8, user clients who transmit or receive files request to the relay server 102 for channel generation at step 800. The channel generation requesting information includes the user information as illustrated, for example, in FIG. 4.

The channel generating module 310 of the relay server 102 generates channels according to the channel generation requesting information of the user and provides unique IDs to the generated channels at step 802. The user who generated the channels may then request to the relay server 102 an invitation of an opponent user for the file transmission at step 804. The invitation requesting information may include ID information of the opponent user.

The channel participation processing module 314 transmits the ID of the opponent user to another server (such as, the messenger central server 202, or the user information managing server 600) and requests the invitation of a corresponding user at step 806. Of course, when the address of the opponent user is already known since the address information of the opponent user is provided from the channel generator, the relay server 102 may transmit the invitation message directly.

For example, the relay server 102 may request, to the messenger central server 202, an invitation of a user with a specific ID, and the messenger central server 202 transmits the invitation message to the user with the corresponding ID. Otherwise, a file sender may provide address information, such as an IP address of a file receiver to the relay server 102, and the relay server 102 may transmit the invitation message directly to the IP address of the file receiver.

The server (such as, the messenger central server 202, or the user information managing server 600), receiving the invitation request from the relay server 102, transmits the invitation message to the file receiver client according to the request information from the relay server 102 at step 808. The file receiver client transmits the channel participation requesting information to the relay server 102 at step 810. The channel participation requesting information can include the user information shown, for example, in FIG. 4 of the invited user.

The channel participation processing module 314 of the relay server 102, receiving the channel participation requesting information of the invited user, accepts the channel participation of the corresponding user at step 812 and transmits the channel participation information to the file sender client who generated the channel at step 814. The channel participation information can include the information of the opponent user. The user who transmits the file by the process in FIG. 8 may participate in the same channel of the relay server 102 and confirm the public IP address, the public port number, the private IP address and the private port number of the opponent user.

Figure 9:
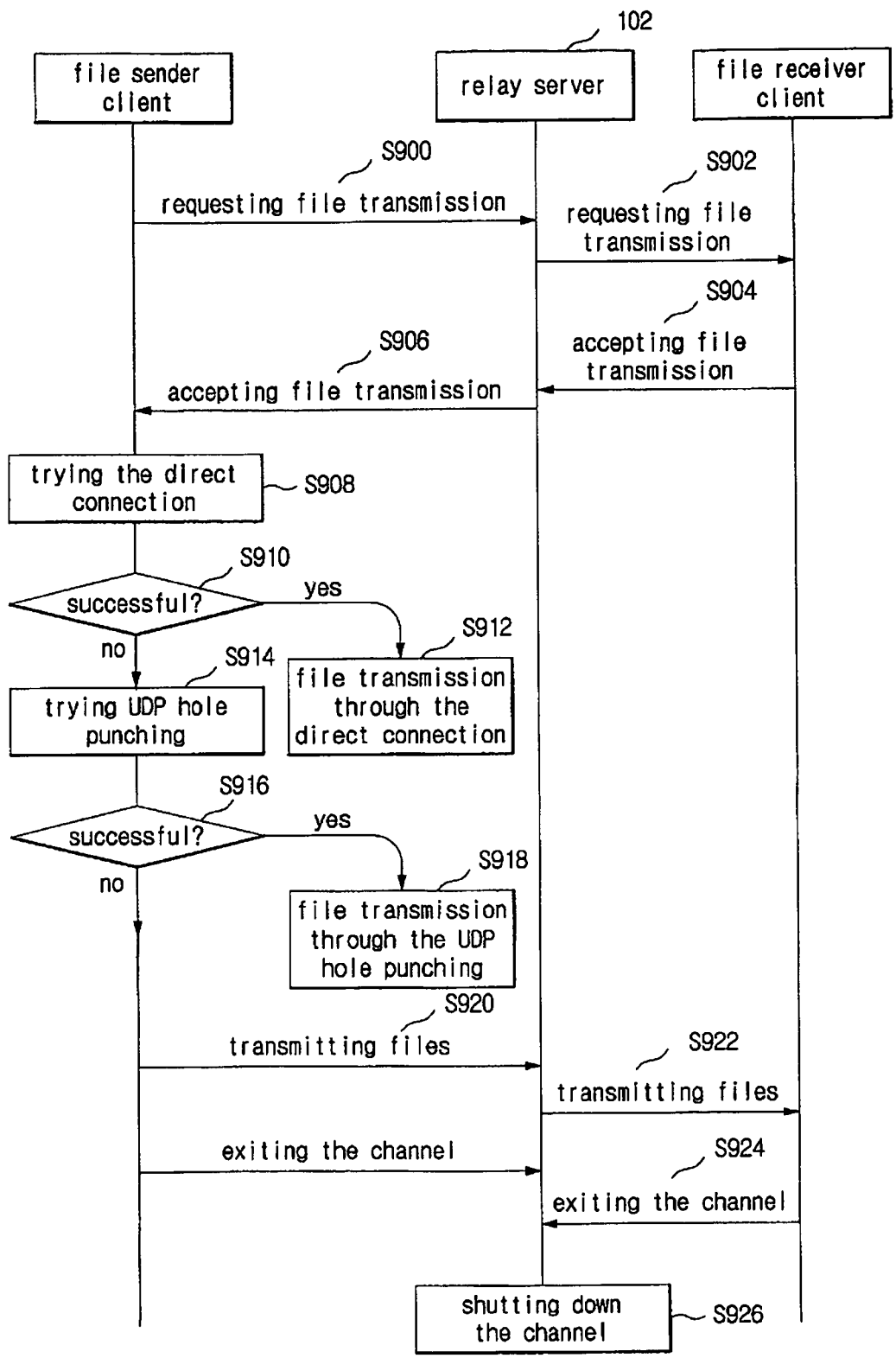
FIG. 9 shows a flowchart of the file transmission method after the channel generation according to an embodiment of the present disclosure.

FIG. 9 shows a flowchart of the file transmission method after the channel generation according to an embodiment of the present disclosure. Referring to FIG. 9, a user who transmits files transmits the file transmission requesting information to the relay server 102 at step 900. The file transmission requesting information may include file names and file size information to be transmitted. The file relaying module 316 of the relay server 102 transmits the file transmission requesting information to the file receiver client at step 902.

The file receiver client accepts the file transmission at step 904, and the file transmission accepting information is transmitted to the user who transmits the file via the file relaying module 316 at step 906. The steps from step 900 to step 906 can be described with reference to the messenger system in which the user, who transmits the file, first starts the action of file transmission. But, when the P2P file sharing system in which the user, who receives the file, first requests the file transmission, the file receiver may request the file transmission.

When the file sender and the file receiver agree with the file transmission, the transmission between the clients of the file sender and the file receiver by the direct connection is tried at step 908. The client of the file sender and the client of the file receiver configure the TCP connection, and perform the file transmission through the configured connection.

As the file transmission becomes successful by the TCP connection at step 910, the file transmission is performed continuously through the configured TCP connection at step 912. According to an embodiment of the present disclosure, the file transmission is considered a failure when the file is not transmitted to the file receiver client from the file sender client, or when the file is transmitted at a lower rate than the predetermined critical rate to the file receiver client from the file sender client.

If the file transmission is failed through the TCP connection configured directly, the UDP hole punching is tried at step 914. When the file is transmitted properly by the UDP hole punching at step 916, files can be transmitted continuously through the connection configured by the UDP hole punching at step 918.

The P2P application installed in the file sender client requests to the file relaying module for the file relay and transmits the file data in case the file transmission by the TCP direct connection and the UDP hole punching has failed at step 920. The header information of the transmitted file data includes channel ID information. The relay server 102 may transmit the file to the file receiver client participating in the corresponding channel through the channel corresponding to the channel ID.

As the file transmission is completed, the file sender client and the file receiver client exit the channel at step 924. If all the users exit the channel, the relay server 102 shuts down the generated channel at step 926. According to an embodiment of the present disclosure, the user who transmitted files may transmit another file, so the channel may be shut down after being preserved for a certain period of time after the users exit the channel.

While the disclosure has been described with reference to the disclosed embodiments, it is to be appreciated that those skilled in the art can change or modify the embodiments without departing from the scope and spirit of the disclosure or its equivalents as stated below in the claims.

As described above, the P2P file transmission system and method of the disclosure allows stable file transmissions even under the unstable environment for P2P file transmission with NAT. And, according to an embodiment of the present disclosure, the P2P file transmission system may monitor the condition of the file transmission and can relay the file transmission through a separate server when the file transmission is unstable, so that the P2P file transmission can be performed regardless of the network place, and the P2P file transmission can be applied to various network places.

What is claimed is:

1. A peer to peer (P2P) file transmission method that uses a processor, comprising:
    managing, using a P2P node managing system, information on user clients connected through a network, the information on the user clients comprising information on a user identifier (ID), address, and file data to share via the network, wherein the P2P node managing system is connected to the user clients through the network;
    generating, using the processor, a channel through a relay server in response to a request of a first user client for communications with a second user client, wherein the channel generated has unique channel ID information;
    generating, with the relay server, a channel invitation message for the second user;
    sending the channel invitation message to the second user client, based on the information on the connected user clients provided by the P2P node managing system;
    the second user client sending a participation message in response to the channel invitation message and participating in the channel;
    relaying information for P2P file transmission between the first and second user clients participating in the generated channel through the generated channel;
    determining whether a previously attempted P2P file transmission by a direct connection between the first and second user client was successful;
    relaying the P2P file transmission between the user clients through the generated channel on the relay server in response to determining that the P2P file transmission by the direct connection between the first and second user clients participating in the channel has failed; and
    shutting down the generated channel after all users have exited the channel, wherein the generated channel is preserved for a certain period of time after all users have exited the channel prior to shutting down said channel.

2. The P2P file transmission method of claim 1, wherein the determining comprises:
    determining whether a previously attempted Transmission Control Protocol (TCP) connection between the first and second user clients was successful; and
    determining whether a previously attempted connection through User Datagram Protocol (UDP) hole punching is successful if the TCP connection has failed.

3. The P2P file transmission method of claim 1, wherein the generating the channel comprises assigning the generated channel a channel ID, and wherein data packets relayed through the channel between the first and second user clients comprise the channel ID.

4. A relay server for assisting peer to peer (P2P) file transmission, comprising:
    a channel generating module stored on one or more non-transitory computer-readable storage devices and configured to manage information of user clients connected through a network, to cooperate with a P2P node managing system providing information about connected user clients, to establish a channel, with unique channel ID information, on the relay server according to a request of a first user client for communications with a second user client, and to shut down the generated channel after all users have exited the channel, wherein the generated channel is preserved for a certain period of time after all users have exited the channel prior to shutting down said channel, and wherein the P2P node managing system is connected to the first and second user clients through the network;
    a channel participation processing module stored on the one or more non-transitory computer-readable storage devices and configured to generate a channel invitation message and to send the channel invitation message, via the relay server, to the second user client, based on the information about the connected user clients provided by the P2P node managing system, wherein the channel participation processing module is further configured to allow the second user client to participate in the channel in response to the second user client's participation message;
    a file relaying module stored on the one or more non-transitory computer-readable storage devices and configured to relay a P2P file transmission between the first user client and the second user client through the channel on the relay server in response to receiving a request from a P2P application indicating that a previous attempt of the P2P file transmission by a direct connection between the first user client and the second user client participating in the channel has failed; and
    a channel information managing module stored on the one or more non-transitory computer-readable storage devices and configured to manage channel data comprising the channel ID information assigned when the channel is generated, a maximum user number defined as the maximum number of users permitted to participate in the channel, and a number of participating users defined as the number of users currently participating in the channel.

5. The relay server of claim 4, wherein the channel data further comprises information indicating a number of the user clients participating in the channel, and information about the user clients participating in the channel.

6. The relay server of claim 4, wherein the relay server is configured to relay information needed for the P2P file transmission between the first user client and the second user client through the channel, and the P2P information needed for the file transmission comprises at least one of public IP addresses, public port numbers, private IP addresses, and private port numbers.

7. The relay server of claim 4, wherein the channel is shut down after a time is elapsed after the first user client and the second user client stop using the channel.

8. A peer to peer (P2P) file transmission system, comprising:
- a P2P node managing system configured to manage information of user clients connected through a network and to provide the information of the connected user clients, the information of the connected user clients comprising information on a user identifier (ID), address, and file data to share via the network, wherein the P2P node managing system is connected to the user clients through the network;
- a non-transitory computer-readable data storage medium to store the information of the connected user clients; and
- a relay server configured to generate a channel, with unique channel ID information, on the relay server in response to a request of a first user client for communications with a second user client, configured to generate a channel invitation message and to send the channel invitation message to the second user client, based on the information on the connected user clients provided by the P2P node managing system, configured to permit the second user client to participate in the channel in response to the second user client's channel participation request, and configured to shut down the generated channel after all users have exited the channel, and wherein the relay server preserves the generated channel for a certain period of time after all users have exited the channel prior to shutting down said channel,
- wherein a P2P application is installed in each of the user clients, transmits the user ID information and the address information to the P2P node managing system when connecting, and tries the P2P file transmission by a direct connection between the first user client and the second user client,
- wherein at least one of the P2P applications installed in the user clients is configured to determine if the P2P file transmission by the direct connection between the first user client and the second user client connected to the P2P node managing system has failed, and
- wherein the relay server is configured to relay a P2P file transmission between the first user client and the second user client through the channel on the relay server in response to determining that the P2P file transmission by a direct connection between the first user client and the second user client connected to the P2P node managing system has failed.

9. The P2P file transmission system of claim 8, wherein if the first user client requests the P2P file transmission with the second user client, the relay server is configured to receive file transmission request information from the first user client and to relay information needed for the P2P file transmission between the first user client and the second user client.

10. The P2P file transmission system of claim 9, wherein the information needed for the file transmission comprises at least one of a user ID information, public IP address information, public port numbers, private IP address information, and private port numbers.

11. The P2P file transmission system of claim 9, wherein the relay server is configured to request, from the P2P node managing system, that the channel invitation message be sent to the second user client when the request of the first user client for communications with the second user client is received.

12. The P2P file transmission system of claim 8, wherein the P2P node managing system comprises at least one of a P2P file sharing system, a messenger file transmission system, an internet telephone system, and a game system.

* * * * *